United States Patent
Donapudi

(10) Patent No.: US 12,145,250 B2
(45) Date of Patent: Nov. 19, 2024

(54) ELECTRIC HAND-HELD POWER TOOL WITH RECHARGEABLE BATTERY PROTECTION

(71) Applicant: Hilti Aktiengesellschaft, Schaan (LI)

(72) Inventor: Ganesh Donapudi, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/025,771

(22) PCT Filed: Sep. 17, 2021

(86) PCT No.: PCT/EP2021/075677
§ 371 (c)(1),
(2) Date: Mar. 10, 2023

(87) PCT Pub. No.: WO2022/069261
PCT Pub. Date: Apr. 7, 2022

(65) Prior Publication Data
US 2023/0347493 A1    Nov. 2, 2023

(30) Foreign Application Priority Data

Sep. 29, 2020    (EP) .................................... 20198953

(51) Int. Cl.
*B25F 5/00*    (2006.01)
(52) U.S. Cl.
CPC .................................. *B25F 5/006* (2013.01)
(58) Field of Classification Search
CPC ...................................................... B25F 5/006
See application file for complete search history.

(56) References Cited

U.S. PATENT DOCUMENTS

| | | | |
|---|---|---|---|
| 7,619,387 B2* | 11/2009 | Amend | H01M 50/244 439/352 |
| 2002/0089306 A1 | 7/2002 | Kubale et al. | |
| 2006/0113100 A1* | 6/2006 | Hsu | B25F 5/02 173/217 |
| 2006/0222931 A1 | 10/2006 | Lin et al. | |
| 2006/0228936 A1* | 10/2006 | Chen | B25F 5/02 439/500 |
| 2012/0171539 A1 | 7/2012 | Rejman et al. | |
| 2020/0215679 A1 | 7/2020 | Tamura et al. | |

FOREIGN PATENT DOCUMENTS

| | | |
|---|---|---|
| DE | 29513651 U1 | 1/1997 |
| EP | 3653340 A1 | 5/2020 |

OTHER PUBLICATIONS

International Search Report of PCT/EP2021/075265 dated Dec. 9, 2021.

* cited by examiner

*Primary Examiner* — Nathaniel C Chukwurah
(74) *Attorney, Agent, or Firm* — Davidson Kappel LLC

(57) ABSTRACT

Electric hand-held power tool having a housing-integrated handle through which a handle axis runs and on whose handle end there is arranged a receiving bay for receiving a rechargeable battery pack, wherein the receiving bay is mounted in the handle end so as to be movable along the handle axis.

20 Claims, 4 Drawing Sheets

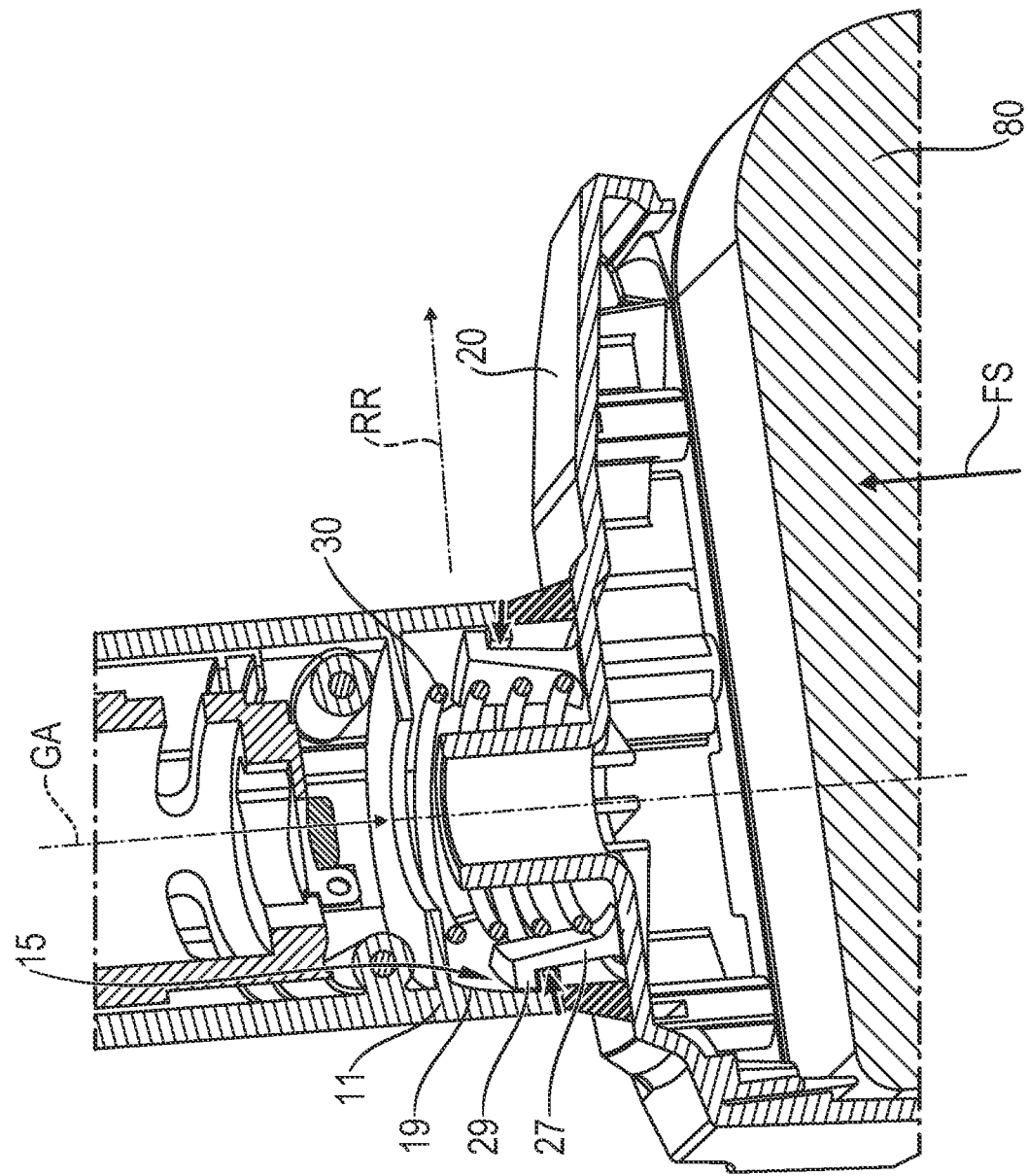

ELECTRIC HAND-HELD POWER TOOL WITH RECHARGEABLE BATTERY PROTECTION

The present invention relates to an electric hand-held power tool having a housing-integrated handle through which a handle axis runs. A receiving bay for receiving a rechargeable battery pack is arranged on a handle end of the handle. The rechargeable battery pack serves to supply the electric hand-held power tool.

BACKGROUND

Electric hand-held power tools of the type mentioned at the beginning are known in principle from the prior art. Also known are rechargeable battery protection devices, for example elastically formed rechargeable battery housings or corner protectors for the rechargeable battery pack.

SUMMARY OF THE INVENTION

It is an object of the present invention to specify an electric hand-held power tool which promotes a basis for rechargeable battery protection in combination with comparatively compact dimensions or proportions of the hand-held power tool.

The present invention provides that the receiving bay is mounted in the handle end so as to be movable along the handle axis.

The invention includes the finding that the previously known rechargeable battery protection devices typically require a comparatively relatively large volume of the hand-held power tool, but at least of the rechargeable battery pack. Consequently, such rechargeable battery packs are indeed secure against impact. However, comfortable working in compact working spaces is frequently hampered. This is avoided in the case of the hand-held power tool according to the invention in that at least part of the rechargeable battery protection device is shifted into the handle end of the hand-held power tool.

It has been found to be advantageous if the hand-held power tool has at least one spring element and/or at least one damper element which acts between the handle end and the receiving bay.

In a particularly preferred embodiment, the receiving bay has a guiding sleeve. It has been found to be advantageous if the guiding sleeve is arranged at least in certain portions in a guiding channel formed in the handle end. In a particularly preferred embodiment, a plurality of ribs are arranged all around the guiding sleeve. In a further preferred embodiment, the ribs are designed to be elastically deflectable outwardly and/or inwardly in the radial direction. It has been found to be advantageous if the ribs, with increasing distance starting from the receiving bay, are inclined outwardly in the radial direction. In a further preferred embodiment, the guiding channel tapers along the handle axis and in a direction facing away from the receiving bay. This is preferably such that the ribs, if the receiving bay and handle end approach one another, are deformed elastically inwardly in the radial direction. The receiving bay and handle end typically approach one another in the case of the hand-held power tool falling onto the rechargeable battery pack. The taper can be designed to be dome-shaped or to be dome-shaped in certain portions. Preferably, the taper adjoins a substantially cylindrical portion of the guiding channel.

It has been found to be advantageous if the ribs are formed in one piece with the receiving bay. Alternatively, the ribs can be provided as components which are different from the receiving bay. In a particularly preferred embodiment, the ribs and/or the receiving bay consist of plastic.

In a further preferred embodiment, the ribs each have a retaining edge, wherein the retaining edge preferably limits a movement of the receiving bay relative to the handle end. It has been found to be advantageous if the retaining edge, together with a projection of the guiding channel, produces an at least one-sided form-fitting connection in the direction of the handle axis.

In a particularly preferred embodiment, the hand-held power tool has a compression spring. It has been found to be advantageous if the compression spring is arranged coaxially to the guiding sleeve. It has furthermore been found to be advantageous if the compression spring is arranged in such a way that it is compressed along the handle axis if the receiving bay and handle end approach one another, for example as a result of an impact. The compression spring can be identical to the at least one spring element of the hand-held power tool. It has been found to be advantageous if both the elastically deformable ribs and the compression spring are involved in fall cushioning and/or fall damping.

In a particularly preferred embodiment, the hand-held power tool is equipped with an elastically deformable sealing sleeve which is preferably arranged along a transition between the handle end and the receiving bay. The sealing sleeve can be supported against the projection and/or against the receiving bay. It has proved to be advantageous if the sealing sleeve acts as a damper along the handle axis. The sealing sleeve can be identical to the at least one damper element of the hand-held power tool.

In a further preferred embodiment, the electric hand-held power tool is designed as a drill driver. It has been found to be advantageous if the hand-held power tool has a rechargeable battery pack which is received, or is to be received, in the receiving bay.

BRIEF DESCRIPTION OF THE DRAWINGS

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

In the figures, identical and similar components are denoted by the same reference signs. In the figures:

FIG. 4 shows the exemplary embodiment of FIG. 1 in detail.

DETAILED DESCRIPTION

Figure 1:
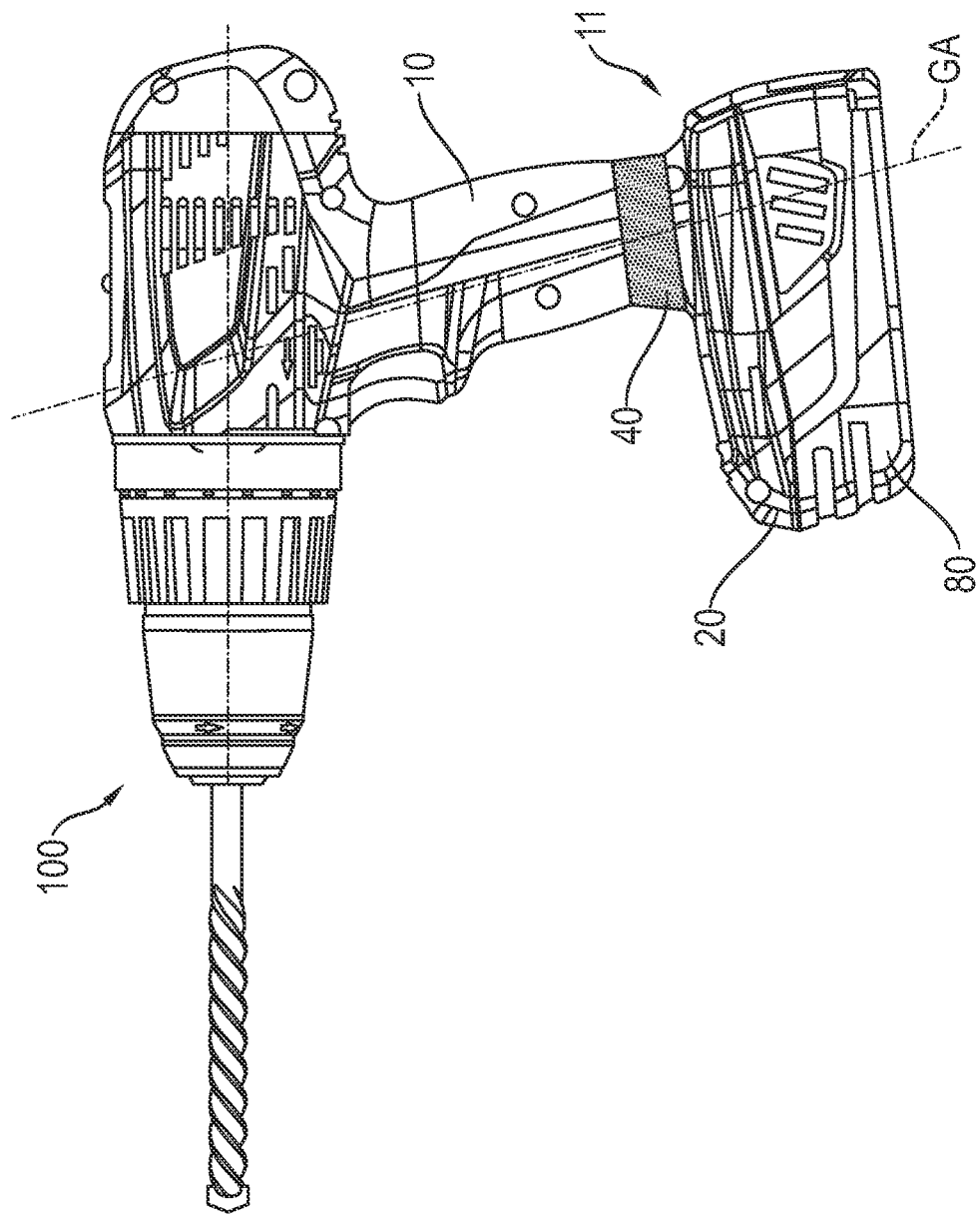
FIG. 1 shows a first exemplary embodiment of an electric hand-held power tool.

A preferred exemplary embodiment of an electric hand-held power tool 100 is illustrated in FIG. 1. As can be gathered from FIG. 1, the hand-held power tool 100 is designed, by way of example, as a drill driver. The hand-held power tool 100 is equipped with a housing-integrated handle 10 through which a handle axis GA runs. During operation, the handle 10 is gripped by a user in order in this way to hold the hand-held power tool 100, for example with one hand. A receiving bay 20 for receiving a rechargeable battery pack 80 is arranged on a handle end 11 of the handle 10. According to the invention, the receiving bay 20 is mounted in the handle end 11 so as to be movable along the handle axis GA. This is indicated in FIG. 2 by the double arrow BR oriented parallel to the handle axis GA.

The receiving bay 20 has a guiding sleeve 25 (cf. FIG. 2) which is arranged at least in certain portions in a guiding channel 15 formed in the handle end 11. All around the guiding sleeve 25 there are arranged a plurality of ribs 27 (cf. also FIG. 2) which are designed to be elastically deflectable outwardly and inwardly in the radial direction RR. It can clearly be seen in FIG. 2 that the ribs 27, with increasing distance starting from the receiving bay 20 (upwardly in FIG. 2), are inclined outwardly in the radial direction RR. In other words, a circumference of the ribs 27 at the transition to the battery pack receptacle 20 is smaller than at the free end of the ribs 27. In order to mount the receiving bay 20 on the handle end 11, the ribs 27 are pressed inwardly in the radial direction RR by hand or machine and inserted into the guiding channel 15. The ribs 27 each have a retaining edge 29. The retaining edge 29 limits a movement of the receiving bay 20 relative to the handle end 11. Expressed more precisely, the retaining edge 29, together with a projection 17 of the guiding channel 15, produces a one-sided form-fitting connection in the handle axis GA in the downward direction. In other words, in FIG. 2 the receiving bay 20 cannot fall downwardly out of the handle end 11.

Figure 2:
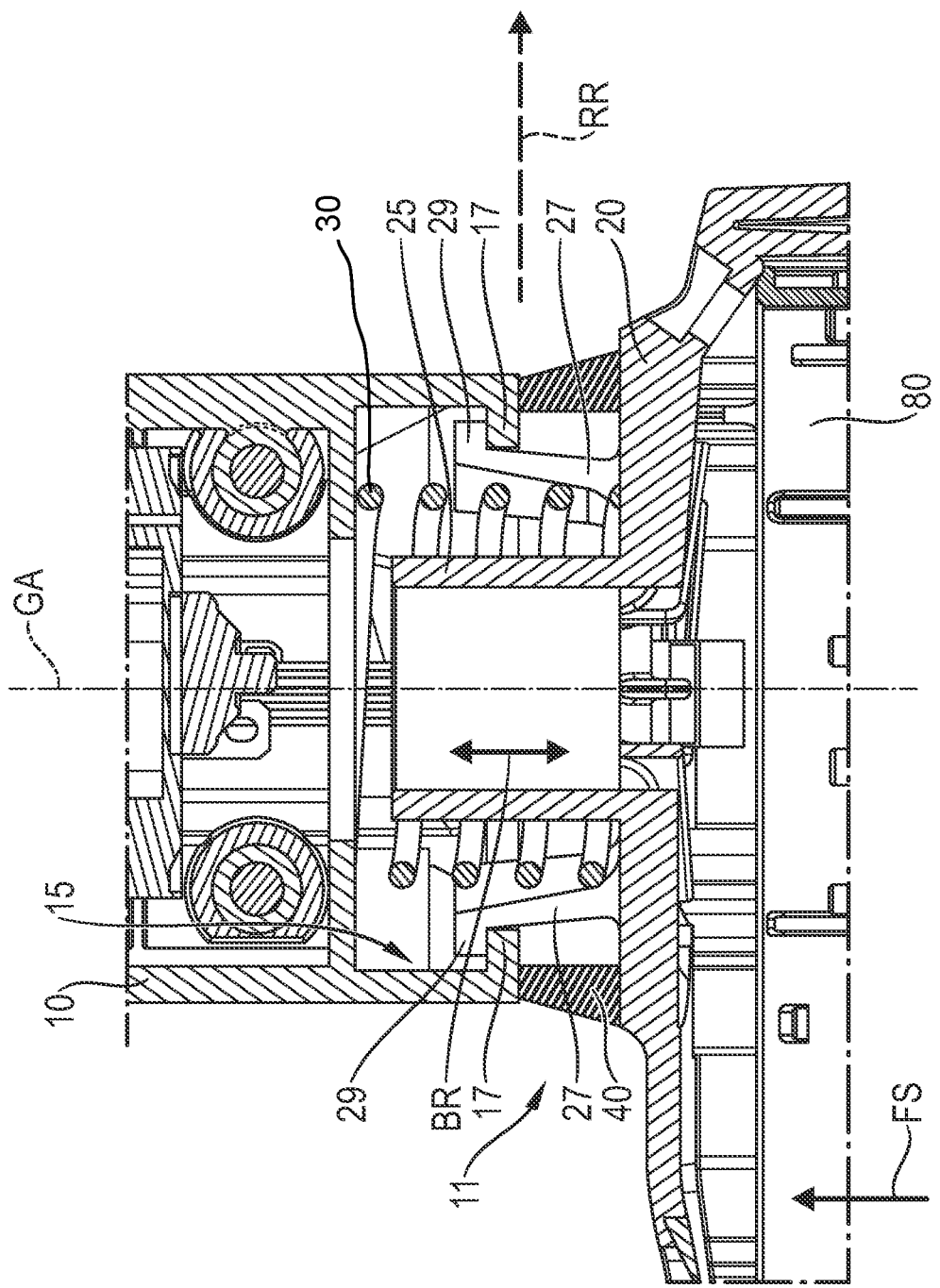
FIG. 2 shows a sectional view through a receiving bay for receiving a rechargeable battery pack.

As can also be gathered from FIG. 2, the hand-held power tool 100 has a compression spring 30 which is arranged coaxially to the guiding sleeve 25. It is possible by way of this compression spring 30 for an impact force FS on the rechargeable battery pack 80 arranged in the receiving bay 20 to be cushioned. Here, the guiding sleeve 25 engages further upward into the guiding channel 15 in the direction of the handle axis GA. Downward swinging out of the compression spring 30 is limited by the already-described form-fitting connection between the retaining edge 29 of the ribs 27 and the projection 17 of the guiding channel 15.

The hand-held power tool 100 also has an elastically deformable sealing sleeve 40 which is arranged along a transition between the handle end 11 and the receiving bay 20. Here, the sealing sleeve 40 encloses the handle end 11, with the result that neither dirt nor moisture can enter the guiding channel 15. The sealing sleeve 40 is supported against the projection 17 and the receiving bay 20. The sealing sleeve 40 consists, by way of example, of an elastomer, with the result that the sealing sleeve 40 acts as a damper along the handle axis GA. In other words, the sealing sleeve 40 is compressed from below in the case of an impact on the rechargeable battery pack 80.

Figure 3:
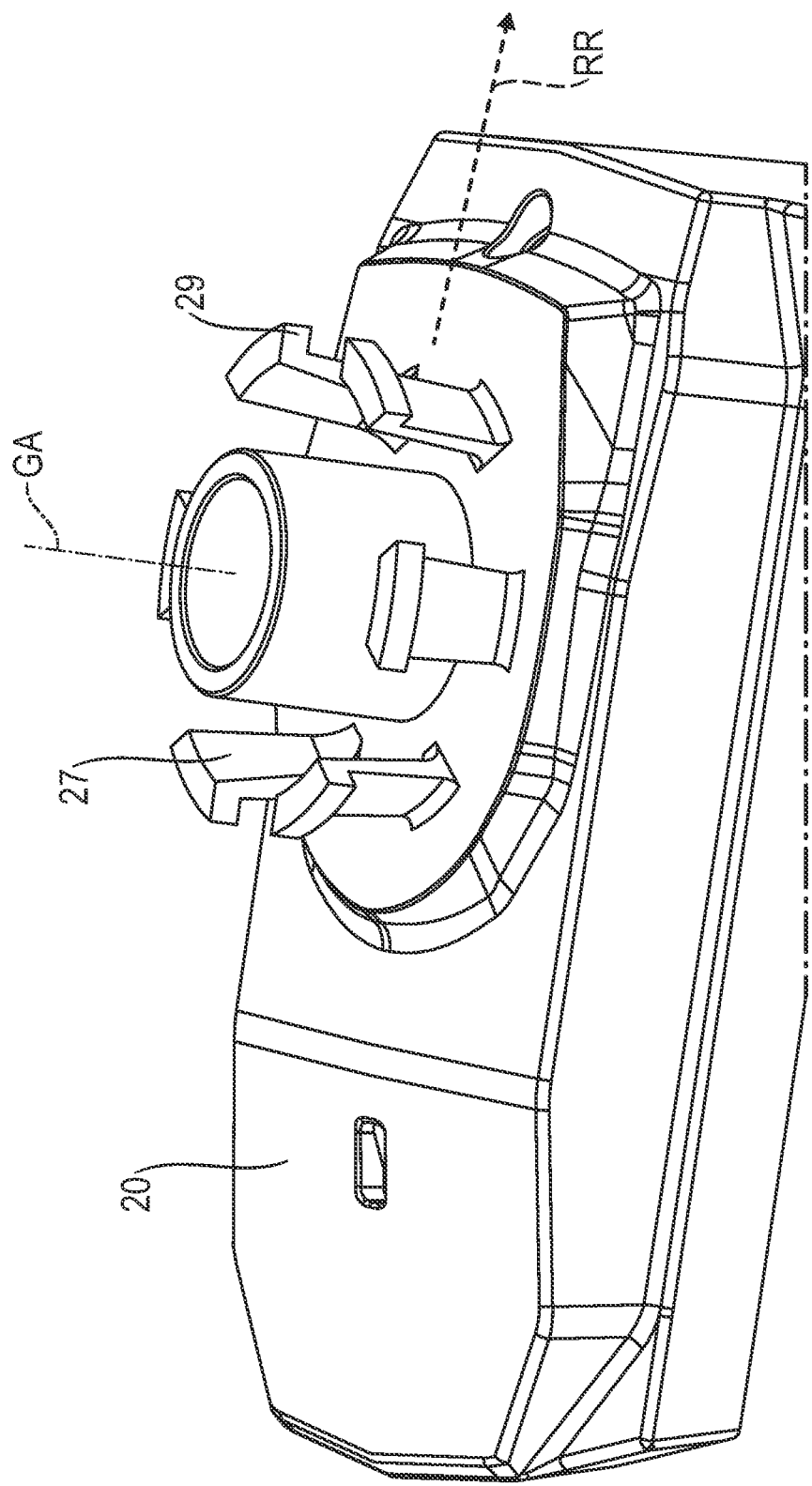
FIG. 3 shows a receiving bay in a perspective illustration.

A receiving bay 20 is illustrated in a perspective illustration in FIG. 3. Clearly visible is the guiding sleeve 25 which projects from the receiving bay 20 and which is surrounded by six ribs 27. The ribs 27 are arranged so as to be uniformly spaced apart from one another around the guiding sleeve 25. Here, the ribs 27 are designed to be elastically deflectable outwardly/inwardly in the radial direction RR and are inclined outwardly in the radial direction RR. In the presently illustrated exemplary embodiment, the ribs 27 are formed in one piece with the receiving bay and consist of plastic.

The spring action of the ribs 27 will now be further explained with reference to FIG. 4. FIG. 4 is a detail illustration of FIG. 1. The substantially cylindrical guiding channel 15 formed in the handle end 11 has a taper 19 in the direction of the handle axis GA (what is meant is the upward direction facing away from the receiving bay 20), along which taper there can slide a respective retaining edge 29 of the ribs 27. By virtue of this taper 19, the ribs 27 are elastically deformed inwardly toward the handle axis GA in the radial direction RR if the receiving bay 20 approaches the handle end 11 as a result of an impact force FS applied to the rechargeable battery pack 80. The elastic deformation of the ribs 27 in the inward direction results in a part of the impact force FS being cushioned. A further part of the impact force is cushioned by the compression spring 30. The spring actions of the ribs 27 and of the compression spring 30 act cooperatively.

LIST OF REFERENCE SIGNS

10 Handle
11 Handle end
15 Guiding channel
17 Projection
19 Taper
20 Receiving bay
25 Guiding sleeve
27 Ribs
29 Retaining edge
30 Compression spring
40 Sealing sleeve
80 Rechargeable battery pack
90 Housing
100 Electric hand-held power tool
BR Direction of movement of the receiving bay relative to the handle
GA Handle axis
RA Axis of rotation
RR Radial direction

What is claimed is:

1. An electric hand-held power tool comprising:
a housing-integrated handle, a handle axis running through the handle, the handle having a handle end;
a receiving bay for receiving a rechargeable battery pack, the receiving bay being mounted in the handle end so as to be movable along the handle axis, the receiving bay having a guiding sleeve; and
a compression spring arranged coaxially to the guiding sleeve.

2. The electric hand-held power tool as recited in claim 1 wherein the compression spring acts between the handle end and the receiving bay.

3. The electric hand-held power tool as recited in claim 1 wherein the guiding sleeve is arranged at least in certain portions in a guiding channel formed in the handle end.

4. The electric hand-held power tool as recited in claim 3 further comprising a plurality of ribs around the guiding sleeve and designed to be elastically deflectable outwardly or inwardly in a radial direction of the guiding sleeve.

5. The electric hand-held power tool as recited in claim 4 wherein the ribs, with increasing distance starting from the receiving bay, are inclined outwardly in the radial direction.

6. The electric hand-held power tool as recited in claim 4 wherein the guiding channel tapers along the handle axis and in a direction facing away from the receiving bay, with the result that the ribs, if the receiving bay and handle end approach one another, are deformed elastically inwardly in the radial direction.

7. The electric hand-held power tool as recited in claim 4 wherein
the ribs each have a retaining edge limiting a movement of the receiving bay relative to the handle end.

8. The electric hand-held power tool as recited in claim 1 further comprising an elastically deformable sealing sleeve arranged along a transition between the handle end and the receiving bay.

9. The electric hand-held power tool as recited in claim 8 wherein the sealing sleeve acts as a damper along the handle axis.

10. The electric hand-held power tool as recited in claim 1 wherein the electric hand-held power tool is designed as a drill driver.

11. An electric hand-held power tool comprising:
- a housing-integrated handle, a handle axis running through the handle, the handle having a handle end;
- a receiving bay for receiving a rechargeable battery pack, the receiving bay being mounted in the handle end so as to be movable along the handle axis; and
- a spring or a damper acting between the handle end and the receiving bay.

12. The electric hand-held power tool as recited in claim 11 wherein the receiving bay has a guiding sleeve arranged at least in certain portions in a guiding channel formed in the handle end.

13. The electric hand-held power tool as recited in claim 12 further comprising a plurality of ribs around the guiding sleeve and designed to be elastically deflectable outwardly or inwardly in a radial direction of the guiding sleeve.

14. The electric hand-held power tool as recited in claim 13 wherein the ribs, with increasing distance starting from the receiving bay, are inclined outwardly in the radial direction.

15. The electric hand-held power tool as recited in claim 13 wherein the guiding channel tapers along the handle axis and in a direction facing away from the receiving bay, with the result that the ribs, if the receiving bay and handle end approach one another, are deformed elastically inwardly in the radial direction.

16. The electric hand-held power tool as recited in claim 13 wherein the ribs each have a retaining edge limiting a movement of the receiving bay relative to the handle end.

17. The electric hand-held power tool as recited in claim 11 wherein the electric hand-held power tool is designed as a drill driver.

18. An electric hand-held power tool comprising:
- a housing-integrated handle, a handle axis running through the handle, the handle having a handle end;
- a receiving bay for receiving a rechargeable battery pack, the receiving bay being mounted in the handle end so as to be movable along the handle axis; and
- an elastically deformable sealing sleeve arranged along a transition between the handle end and the receiving bay.

19. The electric hand-held power tool as recited in claim 18 wherein the sealing sleeve acts as a damper along the handle axis.

20. The electric hand-held power tool as recited in claim 18 wherein the electric hand-held power tool is designed as a drill driver.

* * * * *